(12) United States Patent
Bender et al.

(10) Patent No.: US 11,292,383 B2
(45) Date of Patent: Apr. 5, 2022

(54) TRUCK BED UTILITY BAR

(71) Applicants: Frederick F Bender, South Lyon, MI (US); Bryan J Macek, Auburn Hills, MI (US)

(72) Inventors: Frederick F Bender, South Lyon, MI (US); Bryan J Macek, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 240 days.

(21) Appl. No.: 16/801,766

(22) Filed: Feb. 26, 2020

(65) Prior Publication Data
US 2021/0261040 A1 Aug. 26, 2021

(51) Int. Cl.
B60P 7/08 (2006.01)
B62D 33/02 (2006.01)
B60R 9/06 (2006.01)

(52) U.S. Cl.
CPC ............ B60P 7/0815 (2013.01); B60R 9/06 (2013.01); B62D 33/0207 (2013.01)

(58) Field of Classification Search
CPC ......... B60P 7/15; B60P 7/0815; B60P 7/0817; B60P 7/135; B62D 33/0207; B60R 9/06
See application file for complete search history.

(56) References Cited

U.S. PATENT DOCUMENTS

| | | |
|---|---|---|
| 3,110,506 A | 11/1963 | O'Brien |
| 3,677,562 A | 7/1972 | Bronstein |
| 4,396,324 A | 8/1983 | Ellis |
| 5,560,576 A | 10/1996 | Cargill |
| 5,688,087 A | 11/1997 | Stapleton et al. |
| 5,954,381 A * | 9/1999 | Theriot ............... B62D 27/065 296/37.6 |
| 6,464,437 B1 | 10/2002 | Elwell |
| 6,764,259 B1 | 7/2004 | Preta |
| 7,431,549 B1 * | 10/2008 | Prentice .................. B60P 7/08 410/106 |
| 7,503,738 B1 | 3/2009 | Doyle |
| 10,647,504 B2 * | 5/2020 | Kanczuzewski ... B65D 90/0053 |
| 11,173,828 B2 * | 11/2021 | Bender ................ B60P 7/0807 |
| 2004/0067119 A1 * | 4/2004 | White ...................... B60P 7/15 410/143 |
| 2015/0314814 A1 * | 11/2015 | Pulleyblank ....... B62D 33/0207 296/183.1 |
| 2015/0329059 A1 * | 11/2015 | Jobe .......................... B60R 9/06 224/403 |
| 2018/0111563 A1 * | 4/2018 | Leff Yaffe ................. B60R 9/10 |
| 2019/0256156 A1 * | 8/2019 | Schuling ........... B62D 33/0207 |
| 2020/0017018 A1 * | 1/2020 | Estey ....................... B60P 7/15 |

FOREIGN PATENT DOCUMENTS

CA 2690073 C 5/2012

* cited by examiner

Primary Examiner — Corey N Skurdal
(74) Attorney, Agent, or Firm — Ralph E. Smith

(57) ABSTRACT

A utility bar configured to be secured to a pair of stake pockets formed in opposing sidewalls of a bed of a vehicle. Each of the stake pockets includes an opening formed in an upper wall of the sidewall, a first aperture that is not accessible from the bed, and a second aperture that is accessible from the bed. The utility bar includes a tubular member, a pair of end fittings attached to the tubular member, and a pair of lock assemblies positioned in the stake pockets that mate with the end fittings, wherein the lock assemblies each include a locking mechanism configured to secure the lock assembly and the end fitting to the first aperture that is not accessible from the bed.

18 Claims, 9 Drawing Sheets

TRUCK BED UTILITY BAR

FIELD

The present disclosure relates to a truck bed utility bar.

BACKGROUND

Pickup trucks are often used for hauling cargo. To prevent the cargo from shifting during travel, the cargo must frequently be tied down to anchoring devices located on the truck or in the truck bed. Alternatively, a cross-beam may be positioned in the bed of the pickup truck. Most pickup trucks are manufactured to have a plurality of stake pockets spaced around the bed of the pickup, which are recesses formed in the upper wall of the bed that are configured for receipt of a "stake" or pole of a rack system, bed cover, or the like. These stake pockets may also be used for mounting the aforementioned anchoring devices or cross-beams. Unfortunately, many conventional cross-beams that are designed to be seated in the stake pocket may be permanently attached to the stake pocket, which can detract from the aesthetic appearance of the vehicle and prevent mounting of other devices to the truck bed. Alternatively, if the cross-beam is removable, it can easily be stolen.

SUMMARY

According to a first aspect of the present disclosure, there is provided a utility bar configured to be secured to a pair of stake pockets formed in opposing sidewalls of a bed of a vehicle. Each of the stake pockets includes an opening formed in an upper wall of the sidewall, a first aperture that is not accessible from the bed, and a second aperture that is accessible from the bed. The utility bar comprises a tubular member, and a pair of end fittings attached to opposing ends of the tubular member, wherein each end fitting includes a tube receiving end configured for receipt of one of the opposing ends of the tubular member and a lock receiving end configured for insertion into the second aperture that is accessible from the bed. The utility bar further comprises a pair of lock assemblies. Each lock assembly is configured for receipt within a respective opening of one of the stake pockets, and each lock assembly is configured to mate with the lock receiving end of a respective end fitting within the stake pocket at a location positioned inboard from the second aperture that is accessible from the bed. The lock assemblies each include a locking mechanism configured to secure the lock assembly and the end fitting to the first aperture that is not accessible from the bed.

According to the first aspect of the present disclosure, the lock assembly may include a casing that houses a movable locking lever, the movable locking lever is movable between a locked and an unlocked position, and in the locked position the movable locking lever is configured to engage the first aperture that is not accessible from the bed.

The movable locking lever may be moved by rotation of a locking cylinder located within the casing, wherein the locking cylinder includes a pair of prongs that are engaged with the movable locking lever, and rotation of the prongs moves the movable locking lever between the locked and unlocked positions.

Alternatively, the movable locking lever may be moved by rotation of a rod that is fixed to a depressible and rotatable button that is attached to the casing.

According to the first aspect of the present disclosure, the lock receiving end of the end fitting may include a boss and a pair of spaced-apart retaining flanges, wherein each retaining flange includes a proximal portion that extends away from the boss, and a distal portion that extends orthogonally outward from proximal portion such that a slot is formed between the boss and the distal portion.

According to the first aspect of the present disclosure, the lock assembly may include a casing having an elongated slot formed therein, and opposing edges of the elongated slot are configured to mate with the slots formed between the boss and the distal portions of the spaced-apart retaining flanges.

According to the first aspect of the present disclosure, the utility bar may include a cleat or anchor device that is attached to the tubular member.

According to the first aspect of the present disclosure, the tubular member may include a first section telescopically received within a second section.

According to a second aspect of the present disclosure, there is provided a utility bar configured to be secured to a pair of stake pockets formed in opposing sidewalls of a bed of a vehicle, wherein each of the stake pockets includes an opening formed in an upper wall of the sidewall, a first aperture that is not accessible from the bed, and a second aperture that is accessible from the bed. The utility bar comprises a tubular member; a pair of end fittings attached to opposing ends of the tubular member, wherein each end fitting includes a first end configured for receipt of one of the opposing ends of the tubular member and an opposite second end configured for insertion into the second aperture that is accessible from the bed; and a pair of retainers configured to be received within the openings of the stake pockets, wherein each retainer includes a movable locking lever that is movable between a locked and an unlocked position, and in the locked position the movable locking lever is configured to engage the first aperture that is not accessible from the bed. Each of the retainers is configured to mate with a respective second end of a respective end fitting within the stake pocket at a location positioned inboard from the second aperture.

According to the second aspect of the present disclosure, each retainer may include a casing that houses a locking cylinder coupled to the movable locking lever, and the movable locking lever is moved by rotation of the locking cylinder located, wherein the locking cylinder includes a pair of prongs that are engaged with the movable locking lever, and rotation of the prongs moves the movable locking lever between the locked and unlocked positions.

Alternatively, according to the second aspect of the present disclosure, each retainer may include a casing that houses a depressible and rotatable button that is coupled to the movable locking lever by a rod, and the movable locking lever is moved by rotation of the button and rod.

According to the second aspect of the present disclosure, the casing may include a socket that supports the button and a shoulder that is exposable upon depression of the button to enable the retainer to be removed from the stake pocket.

According to the second aspect of the present disclosure, the second end of the end fitting may include a boss and a pair of spaced-apart retaining flanges, wherein each retaining flange includes a proximal portion that extends away from the boss, and a distal portion that extends orthogonally outward from proximal portion such that a slot is formed between the boss and the distal portion. The retainer may include a casing having an elongated slot formed therein, and opposing edges of the elongated slot are configured to mate with the slots formed between the boss and the distal portions of the spaced-apart retaining flanges.

According to the second aspect of the present disclosure, the utility bar may further include a cleat or anchor device that is attached to the tubular member.

Lastly, according to the second aspect of the present disclosure, wherein the tubular member may include a first section telescopically received within a second section.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature, intended for purposes of illustration only, and are not intended to limit the scope of the present disclosure, its application or uses. Thus, variations that do not depart from the gist of the present disclosure are intended to be within the scope of the present disclosure.

DETAILED DESCRIPTION

Figure 1:
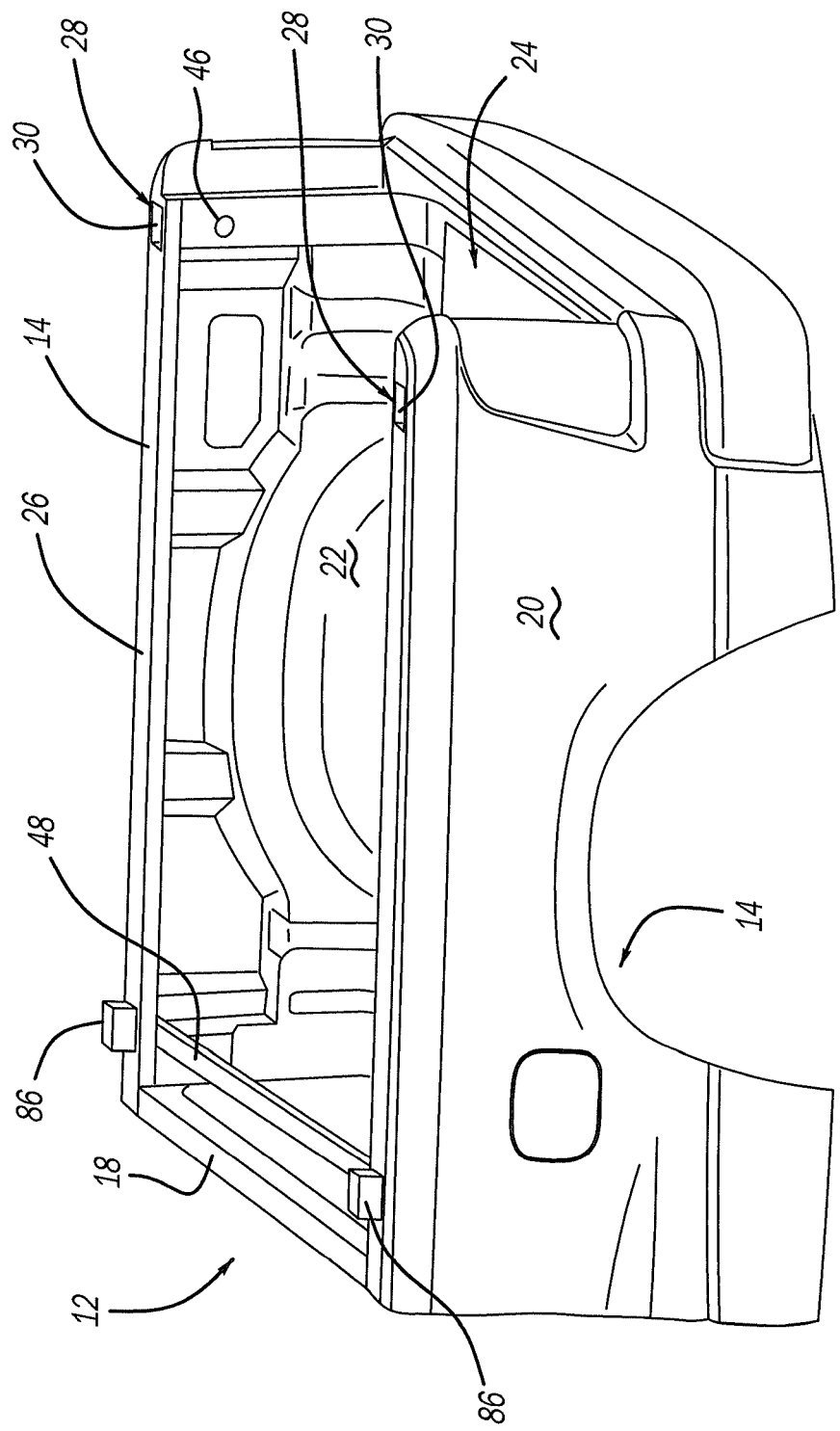
FIG. 1 is a perspective view of a bed of a pickup truck having a plurality of stake pockets.

FIG. 1 illustrates a bed 12 of a pickup truck. Bed 12 includes a pair of sidewalls 14, a tailgate (not shown), and a front wall 18. Sidewalls 14 include an exterior sidewall 20, an interior sidewall 22 that faces an interior 24 of the bed 12, and an upper wall 26 that connects exterior sidewall 20 and interior sidewall 22. Stake pockets 28 having an opening 30 are formed in upper walls 26 at locations proximate tailgate (not shown) and front wall 18. It should be understood, however, that additional stake pockets 28 may be formed in upper walls 26 at any number of locations between tailgate 16 and front wall 18.

Figure 2:
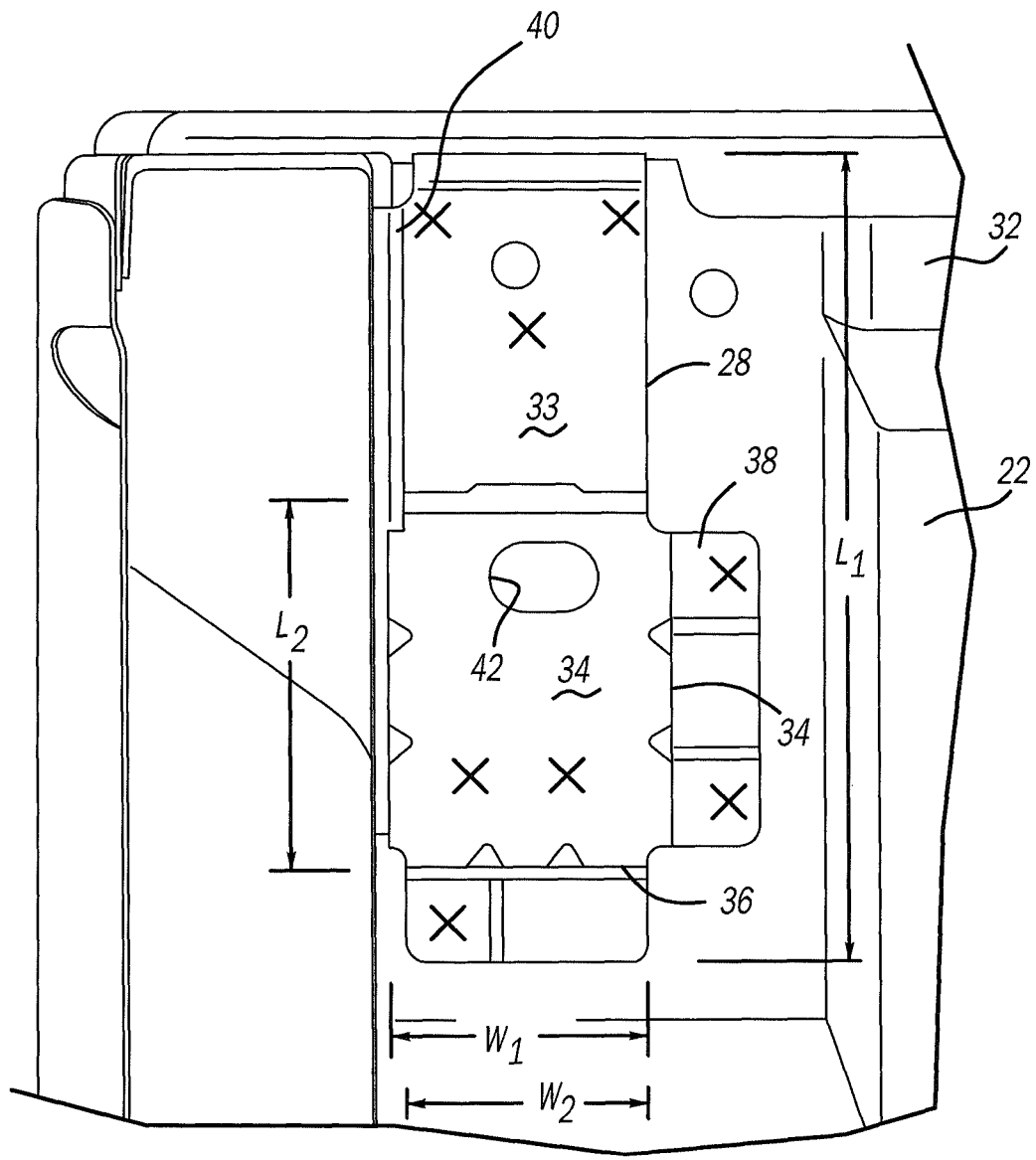
FIG. 2 is a perspective view of a stake pocket located within a sidewall of the bed, with an exterior panel of the sidewall removed.

An example stake pocket 28 is illustrated in FIG. 2, with exterior sidewall 20 of bed 12 being removed. In the illustrated embodiment, stake pockets 28 are monolithic members formed separately from exterior and interior sidewalls 20 and 22, with the exception of opening 30 formed in upper wall 26 of sidewall 14. Stake pockets 28 are generally formed from steel or some other type of metal material so that stake pockets 28 are rigid members, and are fixed to a surface 32 of interior sidewall 22 that faces exterior sidewall 20 by a fastener, such as a screw or by welding, at a location that corresponds to openings 30 formed in upper wall 26. Alternatively, stake pockets 28 can be fixed to a surface (not shown) of exterior sidewall 20 that faces surface 32 of interior sidewall 22, or stake pockets 28 may be formed by portions of the sheet metal that form exterior sidewall 20 and interior sidewall 22, respectively, of sidewalls 14.

Figure 3:
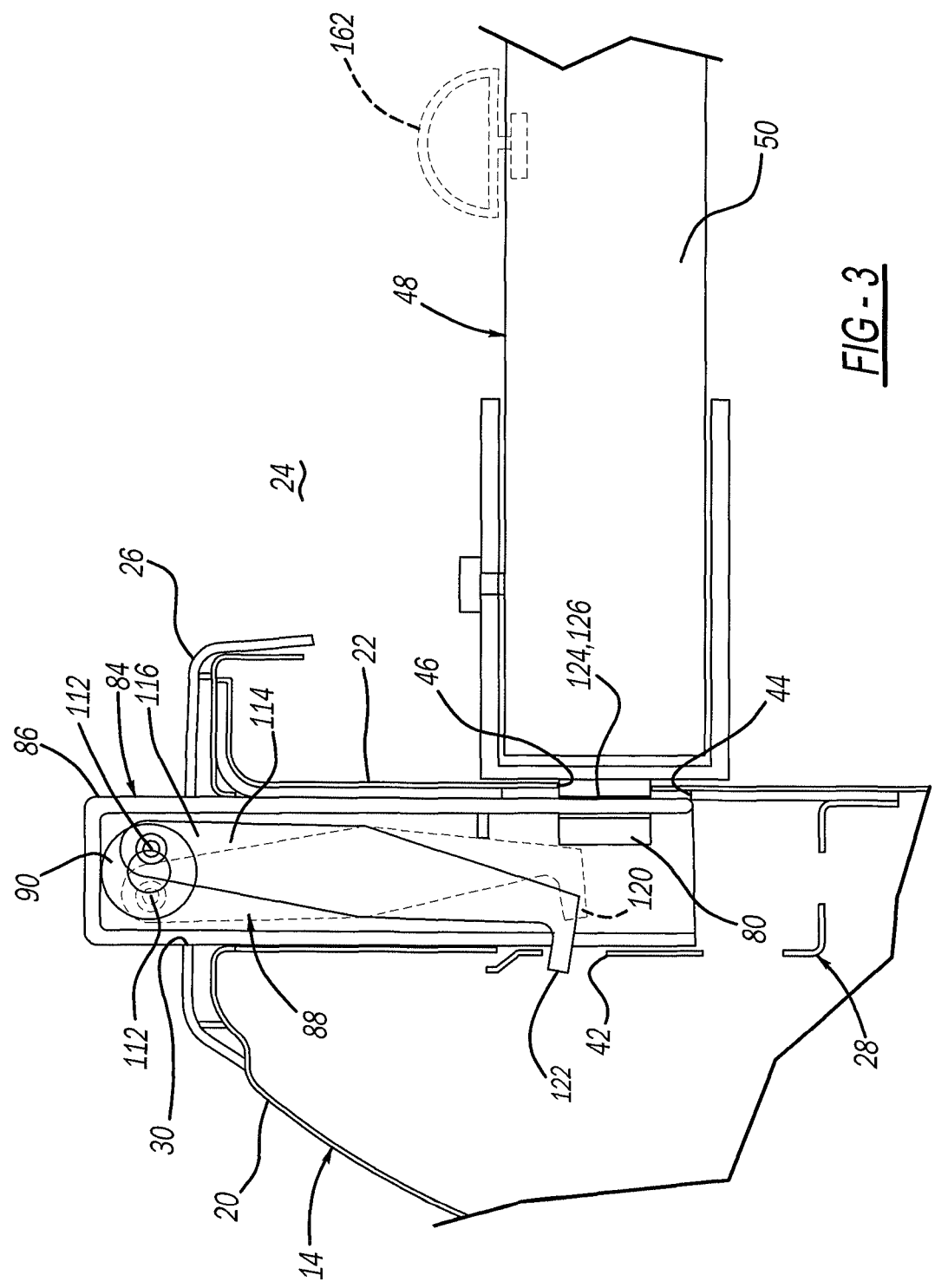
FIG. 3 is a cross-sectional view of an example lock assembly configured to secure a utility bar according to the present disclosure to opposing stake pockets located within the sidewalls of the bed.

Stake pockets 28 include a primary surface 33 that is fixed to surface 32 of interior sidewall 22. Primary surface 33 includes a length L1 and a width W1, which may be selected as desired. In general, length L1 is in the range of 5 to 10 inches and width W is in the range of 2 to 4 inches. Stake pockets 28 also include a plurality of side surfaces 34, and a bottom surface 36. Side surfaces 34 have a length L2 that is less than L1 and a width W2 that is about equal to W1. A first flange 38 extends outward from one of the side surfaces 34 that is configured to be fixed to surface 32 of interior sidewall 22. Although not required, a second flange 40 may extend orthogonal to primary surface 33 that may overlap with one of the side surfaces 34. One of the side surfaces 34 includes at least one first aperture 42, formed therein, that faces exterior sidewall 20. Because first aperture 42 faces exterior sidewall 20, first aperture 42 is not accessible from interior 24 of bed 12. Primary surface 33 includes a second aperture 44 formed therein that is aligned with a through-hole 46 formed in interior sidewall 22, which is illustrated in FIG. 3. Second aperture 44, therefore, is accessible from interior 24 of bed 12 through through-hole 46.

Figure 4:
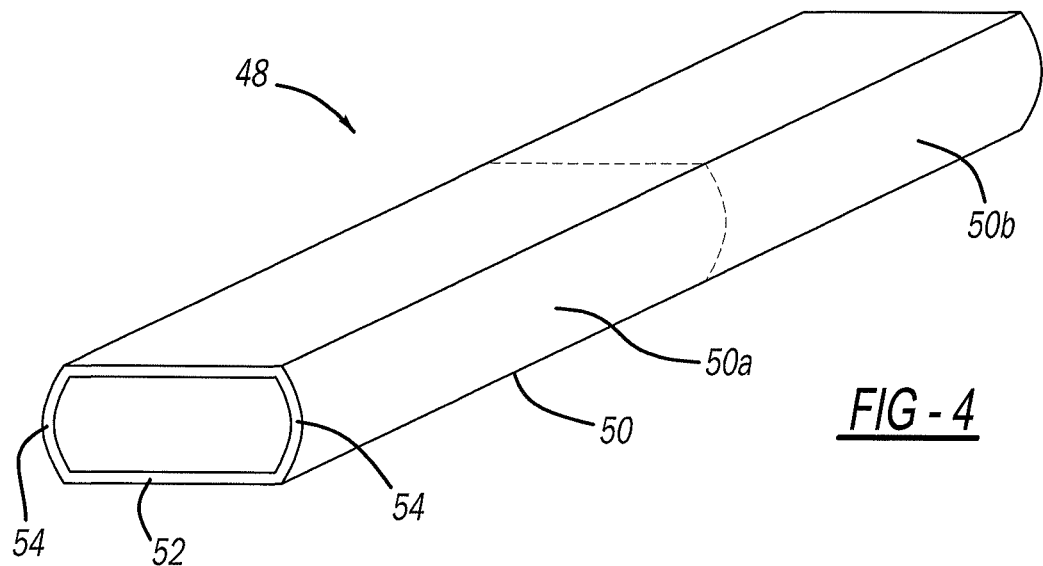
FIG. 4 is a perspective view of the utility bar according to the present disclosure.
Figure 5:
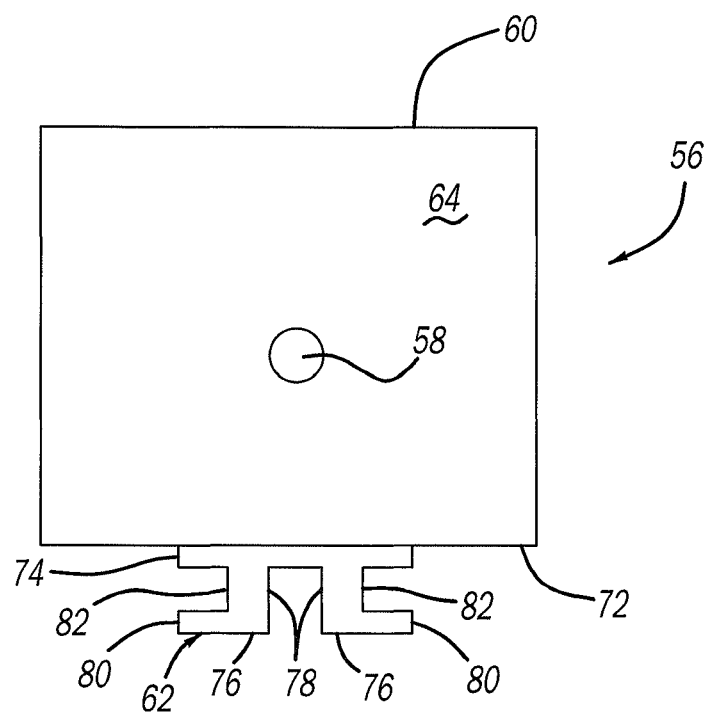
FIG. 5 is a top-perspective view of an end fitting configured to secure the utility bar to the lock assembly illustrated in FIG. 3.
Figure 6:
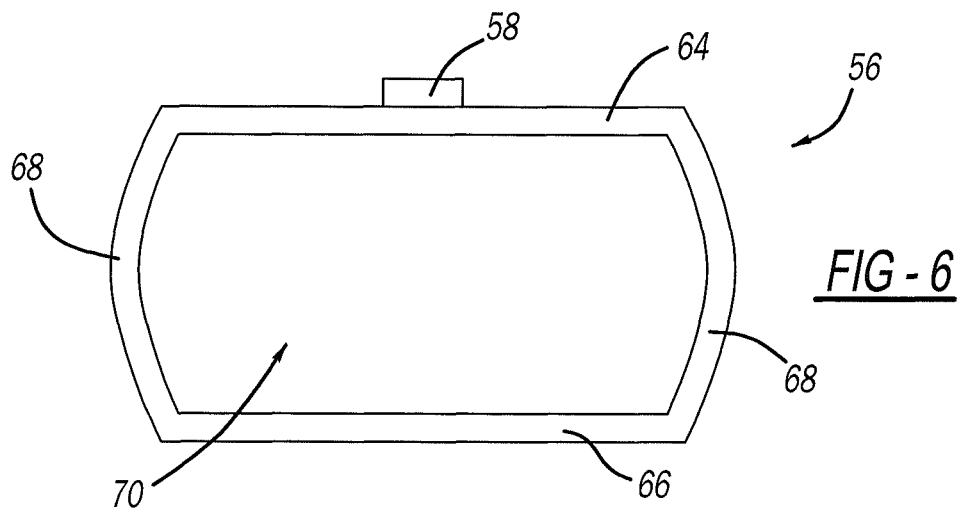
FIG. 6 is a perspective view of a first or utility bar receiving end of the end fitting.
Figure 7:
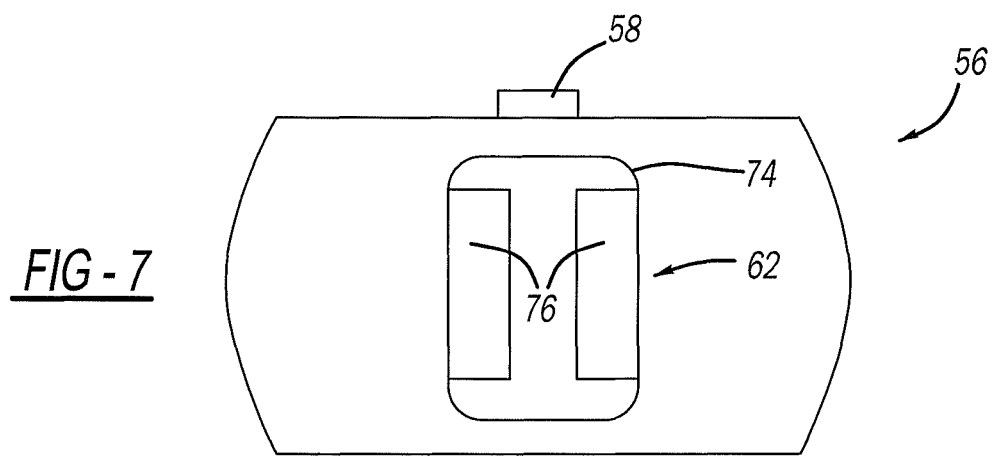
FIG. 7 is a perspective view of a second or lock assembly receiving end of the end fitting.
Figure 8:
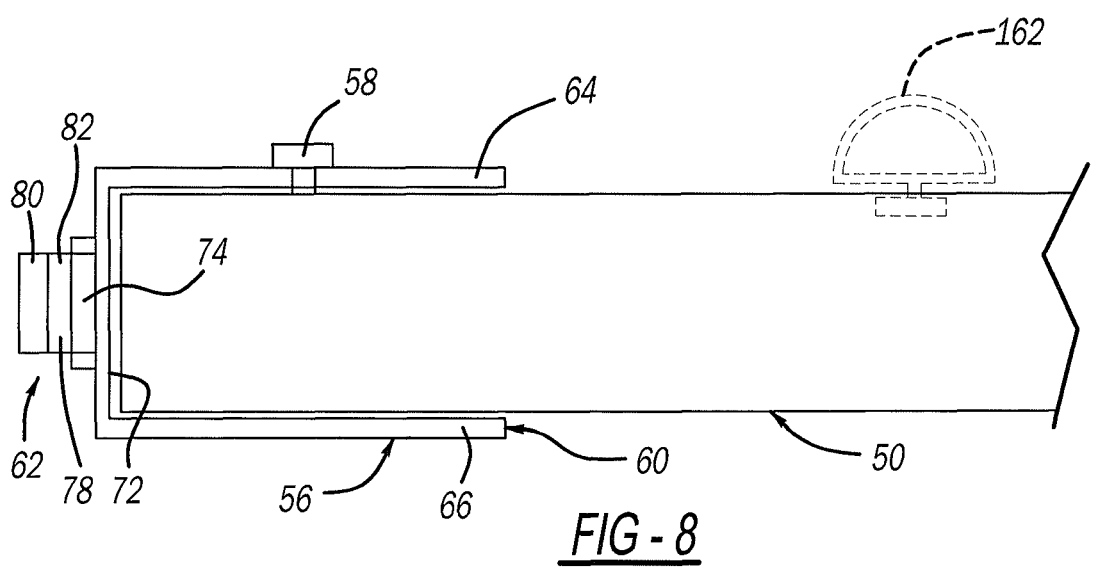
FIG. 8 is a partial cross-sectional view of the end fitting being attached to the utility bar.

Now referring to FIGS. 3 to 8, a utility bar 48 according to the present disclosure is illustrated. Utility bar 48 may be a unitary tubular member 50, or utility bar 48 may include a pair of sections 50a and 50b that are telescopically connected to one another (FIG. 4). In the event that utility bar 48 includes sections 50a and 50b, one of the sections (e.g., 50a) may include a diameter that is less than that of the other section (e.g., 50b) so that section 50a may be received within section 50b (not illustrated). Regardless, utility bar 48 may be formed of a metal material such as steel or aluminum, or a polymeric material that is sufficiently rigid so as to be able to support various loads on the utility bar 48. Tubular member 50 may include a cross-sectional shape that is round, rectangular, square, or oval, without limitation. In the illustrated embodiment, the cross-sectional shape 52 of tubular member 50 is rectangular with rounded side surfaces 54.

As shown in FIGS. 5 to 8, utility bar 48 includes a pair of end fittings 56 that may be attached to tubular member 50 (see, e.g., FIG. 8) by a fastener, such as a set screw 58, so that tubular member 50 can be easily removed from end fittings 56. In the event that tubular member 50 includes sections 50a and 50b that are telescopically connected, sections 50a and 50b may optionally be brazed or welded to a respective end fitting 56 rather than using set screw 58. End fittings 56 are configured to secure tubular member 50 to stake pockets 28 on opposing sides of bed 12 through through-hole 46 and second aperture 44, as will be described in more detail later. In this regard, end fittings 56 include a first or tubular member receiving end 60, configured for receipt of tubular member 50, and an opposite second or lock receiving end 62, configured to be received within through-hole 46, and second aperture 44 of stake pocket 28. Because first end 60 is configured for receipt of tubular member 50, first end 60 includes an upper surface 64, a lower surface 66, and a pair of curved side surfaces 68 that define a hollow pocket 70 that is shaped to correspond to the cross-sectional shape 52 of tubular member 50. In addition, first end 60 includes a rear wall 72 that defines a seat for tubular member 50 when tubular member 50 is received within end fitting 56.

Second end 62 is configured to be received within through-hole 46 and second aperture 44 of stake pocket 28. Second end 62 is defined by an oval-shaped boss 74 that extends outward from rear wall 72, and is shaped to correspond to the shape of through-hole 46, formed in interior sidewall 22. Through-hole 46 and boss 74, however, may have different shapes without limitation, if desired. Regardless, boss 74 assists in locating end fitting 56 relative to through-hole 46. A pair of spaced-apart retaining flanges 76 extend outward from boss 74. Each retaining flange 76 includes a proximal portion 78 that extends away from boss 74, and a distal portion 80 that extends orthogonally outward from proximal portion 78 such that a slot 82 is formed between boss 74 and distal portion 80. Slot 82 is configured for receipt of a portion of a retainer or lock assembly 84, positioned within stake pocket 28 that reliably secures utility bar 48 to stake pocket 28, and prevents theft of utility bar 48.

Figure 9:
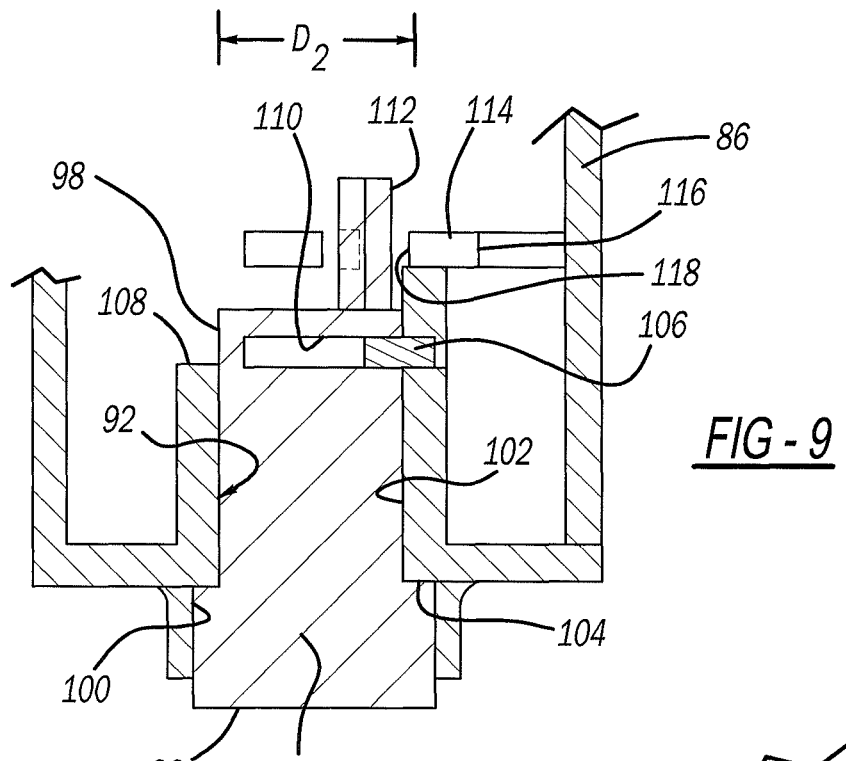
FIG. 9 is a cross-sectional view of a lock cylinder that forms part of the lock assembly illustrated in FIG. 3.
Figure 10:
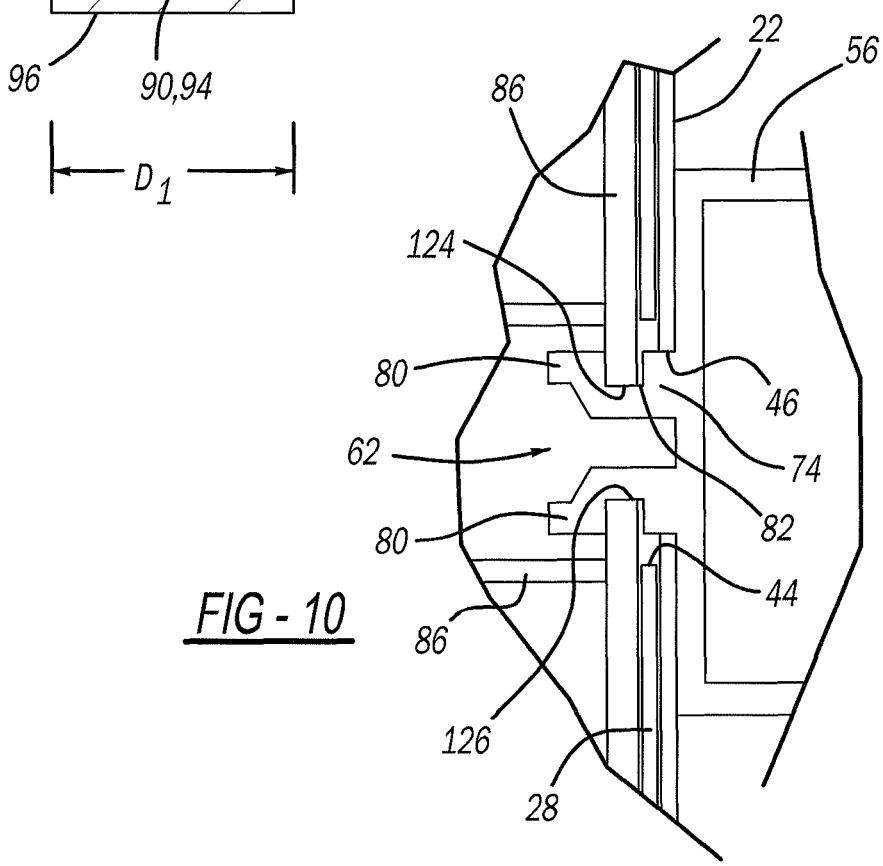
FIG. 10 is a cross-sectional view of the lock assembly being mated with the end fitting.

An example lock assembly 84 is illustrated in FIGS. 3, 9, and 10. Referring to FIG. 3, lock assembly 84 includes a casing 86 that houses a locking mechanism 88. Casing 86 may be formed of a rigid material such as metal, reinforced plastic, or any other material that is rigid and durable. Example metal materials include steel, aluminum, and titanium, and example reinforced plastic materials include polyamide (e.g., Nylon®), without limitation so long as the material is rigid and durable.

Locking mechanism 88 includes a lock cylinder 90 that is rotatable between a locked position and an unlocked position. To rotate lock cylinder 90, lock cylinder 90 may be engaged with a key (not shown). A portion of lock cylinder 90, therefore, is accessible through a through-hole 92 formed in casing 86 (FIG. 9).

More particularly, referring to FIG. 9, lock cylinder 90 is a cylindrical-shaped member 94 having a first end 96 with a first diameter D1 and a second end 98 having a second diameter D2, where D2 is less than D1. Lock cylinder 90 is inserted into through-hole 92, which is defined by first cylindrical bore 100 that extends outward from casing 86, having an inner diameter that is about equal to first diameter D1, and a second cylindrical bore 102 that extends into casing 86, having an inner diameter that is about equal to second diameter D2. Because first cylindrical bore 100 has an inner diameter that is greater than the inner diameter of second cylindrical bore 102, a shoulder 104 is formed between first cylindrical bore 100 and second cylindrical bore 102 that acts as a seat for first end 96 of lock cylinder 90. To retain lock cylinder 90 within first and second cylindrical bores 100 and 102, a radially inwardly extending retainer 106 is formed at a terminal end 108 of second cylindrical bore 102 that mates with a radially inwardly extending slot 110 formed in second end 98 of lock cylinder 90. To mate retainer 106 with slot 110, lock cylinder 90 is inserted into through-hole 92 in a first orientation and then rotated to mate retainer 106 with slot 110.

Lock cylinder 90 includes a prong 112 at second end 98 that extends outward from second end 98. Prong 112 is designed to mate with a lever 114 that is movable between a locked position and an unlocked position. In this regard, lever 114 includes a proximal end 116 having an aperture 118 attached to prong 112 and a distal end 120 (FIG. 3) that defines a hook 122 that is configured to mate with first aperture 42 of the stake pocket 28 that is not accessible from bed 12. When a key (not shown) is inserted into lock cylinder 90 and rotated to lock casing 86 to stake pocket 28, lock cylinder 90 and prong 112 will rotate along with the key. As prong 112 is rotated, the lever 114 will be moved such that hook 122 can be engaged with first aperture 42. When hook 122 is engaged with first aperture 42, casing 86 is prevented from being removable from stake pocket 28.

In order to secure utility bar 48 to lock assemblies 84 located at opposing ends of utility bar 48, second ends 62 of end fittings 56 must first be mated with through-holes 46 and second apertures 44. Once retaining flanges 76 of end fittings 56 are inserted through second aperture 44 of stake pocket 28, casing 86 is inserted into stake pocket 28. As best shown in FIG. 10, as casing 86 is seated into stake pocket 28, edges 124 of an elongated slot 126 formed in casing 86 will mate with slots 82 formed between boss 74 and retaining flanges 76 to secure end fittings 56 to casing 86, and prevent end fittings 56 from being disengaged from second apertures 44 and through-holes 46. Then, locking mechanism 88 can be actuated to engage hook 122 with first aperture 42 such that casing 86 and end fittings 56 having tubular member 50 mated thereto are fixed to stake pocket 28. In this manner, utility bar 48 is reliably secured to stake pockets 28, and prevented from being removed from stake pockets 28 unless locking mechanism 88 is actuated to the unlocked position using the key.

Figure 11:
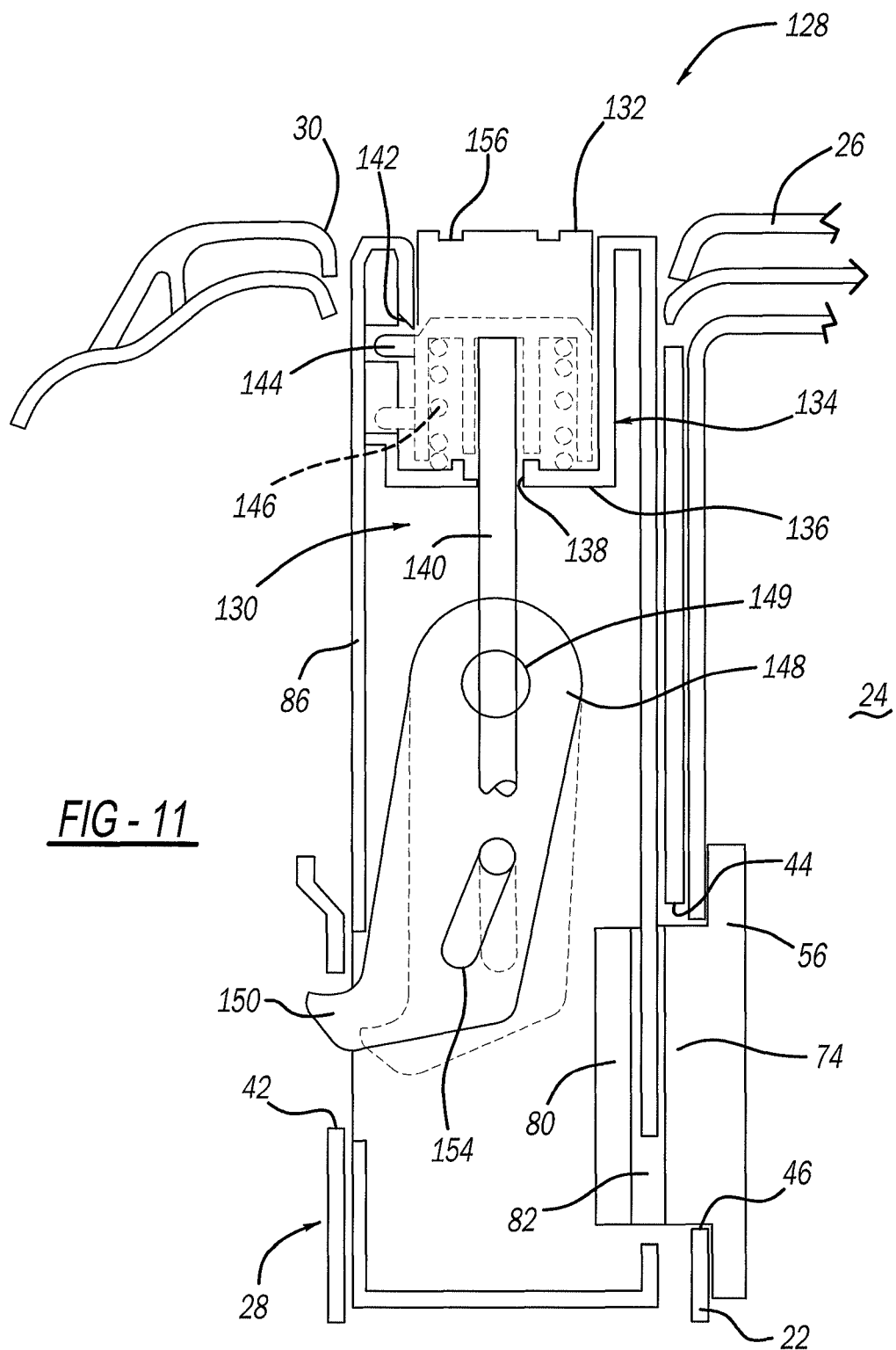
FIG. 11 is a cross-sectional view of another example lock assembly configured to secure a utility bar according to the present disclosure to opposing stake pockets located within the sidewalls of the bed.
Figure 12:
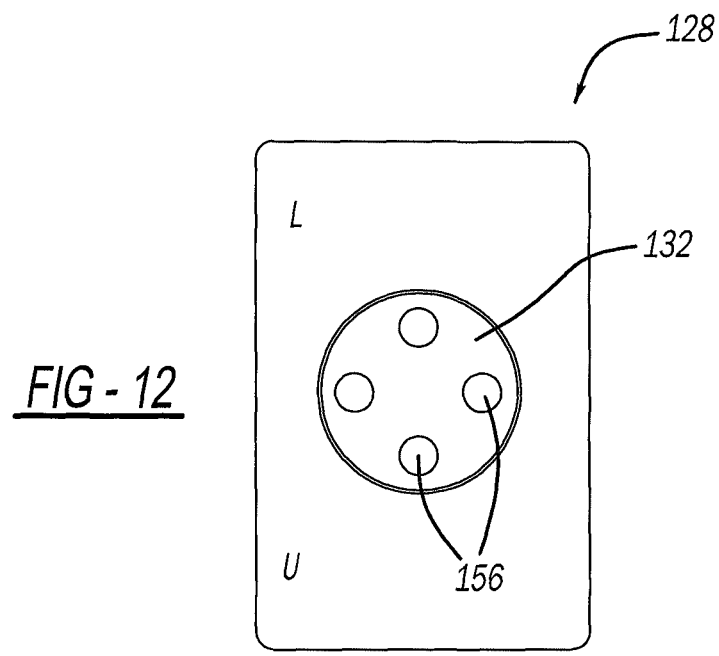
FIG. 12 is a top perspective view of the lock assembly illustrated in FIG. 11.
Figure 13:
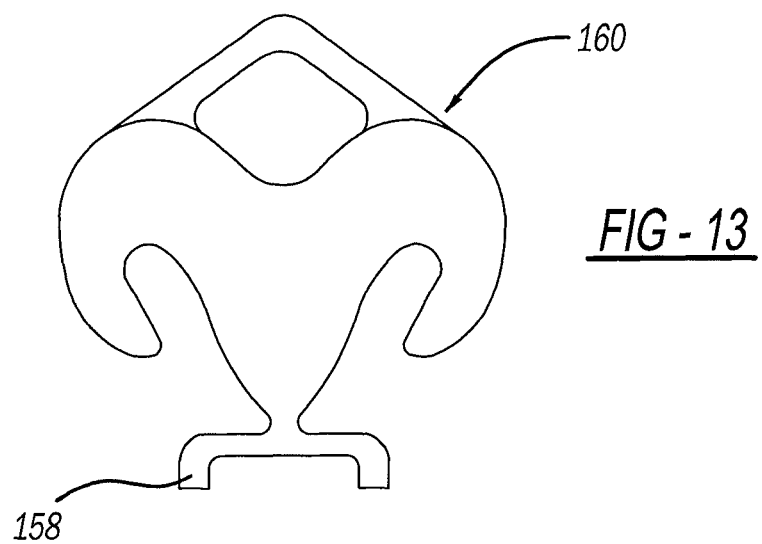
FIG. 13 is a perspective view of a tool configured to actuate the lock assembly illustrated in FIG. 11 between locked and unlocked positions.
Figure 14:
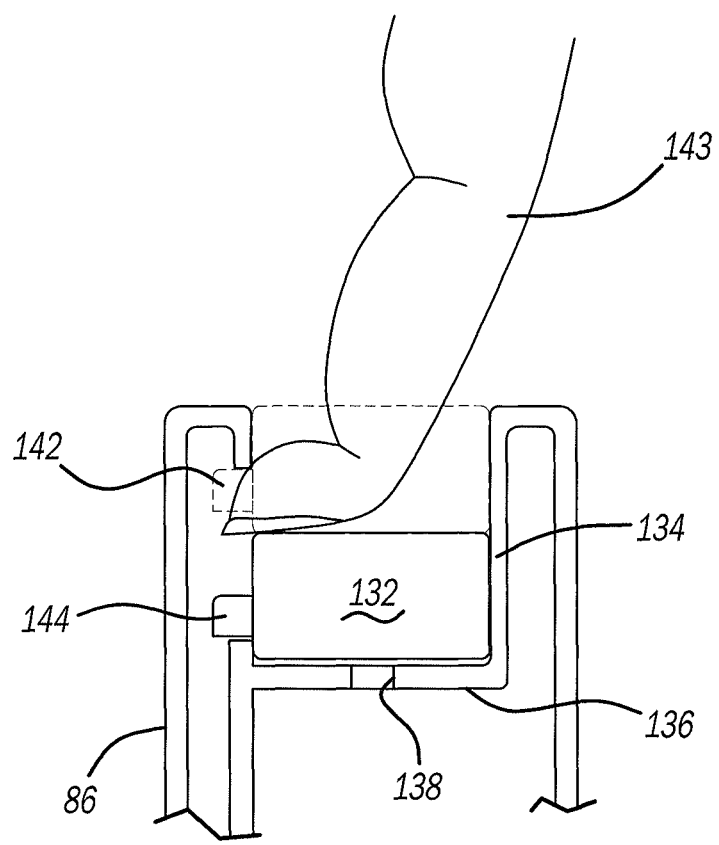
FIG. 14 is a cross-sectional view illustrating a manner of removing the lock assembly illustrated in FIG. 11 from a stake pocket.

Now referring to FIGS. 11 to 14, a lock assembly 128 that is different from lock assembly 84 is illustrated. Lock assembly 128 is different from lock assembly 84 in that the lock mechanism does not include lock cylinder 90. In contrast, a locking mechanism 130 of lock assembly 128 includes a depressible and rotatable cylindrical button 132. As best shown in FIG. 11, casing 86 includes a cylindrical socket 134 configured for receipt of button 132. Socket 134 has a depth that allows for button 132 to be depressed, as will be described in more detail below. A base 136 of socket 134 defines a central opening 138 that acts as a guide for a rod 140 of locking mechanism 130. In addition, socket 134 includes a shoulder 142 that is configured to engage with a radially outwardly extending flange 144 of button 132. In addition, shoulder 142 is configured to act as a gripping feature for removing casing 86 and locking mechanism 130 from stake pocket 28. In this regard, upon depression of button 132 in socket 134, shoulder 142 will become exposed, which allows the owner of the vehicle to grip the shoulder 142 with a finger 143 and lift the casing 86 and locking mechanism 130 from stake pocket 28 (FIG. 14).

Button 132, when rotated to the locked position to align flange 133 with shoulder 142, is biased to abut shoulder 142 by a coil spring 146 seated between button 132 and base 136. Rod 140 is connected to one end thereof to button 132 in a manner that rod 140 will not rotate along with button 132 when button 132 is rotated between the locked and unlocked positions, but will move upward and downward along with button 132. An opposite end of rod 140 is attached to a lock lever 148 including a hook 150 that is actuatable between a locked and unlocked position. Lock lever 148 is rotatably coupled to casing 86 at pivot point 149, and rod 140 includes an arm 152 that extends orthogonally outward from rod 140 that is engaged with an angled slot 154 formed in lock lever 148. Lock lever 148, therefore, does not move upward and downward upon application or removal of a downward force on button 132. In contrast, as button 132 and rod 140 are moved upward and downward (i.e., between locked and unlocked positions), arm 152 is designed to move through angled slot 154 which will force hook 150 to move towards first aperture 42 formed in stake pocket 28 and lock casing 86 to stake pocket 28.

To rotate button 132, button 132 may include a plurality of depressions 156 that are designed to mate with prongs 158 of a special tool 160 that is designed to rotate button 132 (FIGS. 12 and 13). Although the illustrated design includes depressions 156, it should be understood that button 132 can have a contoured recess like that illustrated in the second embodiment without departing from the scope of the present disclosure. Regardless, because casing 86 is configured to be locked to stake pocket 28, casing 86 and utility bar 48 are reliably secured to stake pocket 28, and are prevented from being removed by anyone except the owner of the vehicle that has tool 160.

It should be understood that utility bar 48 is not necessarily just a tubular member 50 that extends about the width of bed 12 of the vehicle. In contrast, it should be understood that utility bar 48 can include various accessories, such as a cleat 162 or some other type of anchor device that is attached to tubular member 50 at various locations along tubular member 50. Another option is for tubular member 50 to include a bike rack (not shown), gun rack, or some other type of rack that can support and secure various items to bed 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A utility bar configured to be secured to a pair of stake pockets formed in opposing sidewalls of a bed of a vehicle, each of the stake pockets including an opening formed in an upper wall of the sidewall, a first aperture that is not accessible from the bed, and a second aperture that is accessible from the bed, the utility bar comprising:
a tubular member;
a pair of end fittings attached to opposing ends of the tubular member, each of the end fittings including a tube receiving end configured for receipt of one of the opposing ends of the tubular member and a lock receiving end configured for insertion into the second aperture that is accessible from the bed; and
a pair of lock assemblies, each of the lock assemblies being configured for receipt within a respective opening of one of the stake pockets, and each of the lock assemblies configured to mate with the lock receiving end of a respective end fitting within the stake pockets at a location positioned inboard from the second aperture that is accessible from the bed,
wherein each of the lock assemblies includes a locking mechanism configured to secure the lock assembly and the end fitting to the first aperture that is not accessible from the bed.

2. The utility bar according to claim 1, wherein the lock assembly includes a casing that houses a movable locking lever, the movable locking lever being movable between a locked position and an unlocked position, and in the locked position the movable locking lever is configured to engage the first aperture that is not accessible from the bed.

3. The utility bar according to claim 2, wherein the movable locking lever is moved by rotation of a locking cylinder located within the casing.

4. The utility bar according to claim 3, wherein the locking cylinder includes a pair of prongs that are engaged with the movable locking lever, and rotation of the prongs moves the movable locking lever between the locked and unlocked positions.

5. The utility bar according to claim 2, wherein the movable locking lever is moved by rotation of a rod that is fixed to a depressible and rotatable button that is attached to the casing.

6. The utility bar according to claim 1, wherein the lock receiving end of the end fitting includes a boss and a pair of spaced-apart retaining flanges, each retaining flange including a proximal portion that extends away from the boss, and a distal portion that extends orthogonally outward from the proximal portion such that a slot is formed between the boss and the distal portion.

7. The utility bar according to claim 6, wherein the lock assembly includes a casing having an elongated slot formed therein, and opposing edges of the elongated slot are configured to mate with the slots formed between the boss and the distal portions of the spaced-apart retaining flanges.

8. The utility bar according to claim 1, further comprising a cleat or anchor device that is attached to the tubular member.

9. The utility bar according to claim 1, wherein the tubular member includes a first section telescopically received within a second section.

10. A utility bar configured to be secured to a pair of stake pockets formed in opposing sidewalls of a bed of a vehicle, each of the stake pockets including an opening formed in an upper wall of the sidewall, a first aperture that is not accessible from the bed, and a second aperture that is accessible from the bed, the utility bar comprising:
a tubular member;
a pair of end fittings attached to opposing ends of the tubular member, each of the end fittings including a first end configured for receipt of one of the opposing ends of the tubular member and an opposite second end configured for insertion into the second aperture that is accessible from the bed; and
a pair of retainers configured to be received within the openings of the stake pockets, each of the retainers including a movable locking lever that is movable between a locked position and an unlocked position, and in the locked position the movable locking lever is configured to engage the first aperture that is not accessible from the bed,
wherein each of the retainers is configured to mate with a respective second end of a respective end fitting within the stake pockets at a location positioned inboard from the second aperture.

11. The utility bar according to claim 10, wherein each of the retainers includes a casing that houses a locking cylinder coupled to a movable locking lever, and the movable locking lever is moved by rotation of the locking cylinder.

12. The utility bar according to claim 11, wherein the locking cylinder includes a pair of prongs that are engaged with the movable locking lever, and rotation of the prongs moves the movable locking lever between the locked and unlocked positions.

13. The utility bar according to claim 10, wherein each of the retainers includes a casing that houses a depressible and rotatable button that is coupled to the movable locking lever by a rod, and the movable locking lever is moved by rotation of the button and the rod.

14. The utility bar according to claim 13, wherein the casing includes a socket that supports the button and a shoulder that is exposable upon depression of the button to enable the retainers to be removed from the stake pockets.

15. The utility bar according to claim 10, wherein the second end of the end fitting includes a boss and a pair of spaced-apart retaining flanges, each of the retaining flanges including a proximal portion that extends away from the boss, and a distal portion that extends orthogonally outward from the proximal portion such that a slot is formed between the boss and the distal portion.

16. The utility bar according to claim 15, wherein the retainer includes a casing having an elongated slot formed therein, and opposing edges of the elongated slot are configured to mate with the slots formed between the boss and the distal portions of the spaced-apart retaining flanges.

17. The utility bar according to claim 10, further comprising a cleat or anchor device that is attached to the tubular member.

18. The utility bar according to claim 10, wherein the tubular member includes a first section telescopically received within a second section.

* * * * *